United States Patent [19]

Kinslow

[11] Patent Number: 4,782,537

[45] Date of Patent: Nov. 8, 1988

[54] QUICK CONNECT WATER SAVER FOR A FLUSH TOILET

[75] Inventor: John A. Kinslow, Collegeville, Pa.

[73] Assignee: John A. Kinslow Enterprises, Inc., Collegeville, Pa.

[21] Appl. No.: 56,725

[22] Filed: Jun. 2, 1987

[51] Int. Cl.$^4$ .............................................. E03D 1/00
[52] U.S. Cl. .......................................... 4/415; 4/324; 137/426
[58] Field of Search ................... 4/324, 393, 415, 402, 4/403; 43/44.89–44.92, 44.95; 137/410, 416, 426

[56] References Cited

U.S. PATENT DOCUMENTS

| | | | |
|---|---|---|---|
| 2,214,439 | 9/1940 | Robertson | 4/402 |
| 2,849,827 | 9/1958 | Gardiner | 43/44.9 |
| 3,036,313 | 5/1962 | Jenkins | 4/324 |
| 3,345,648 | 10/1967 | Rafferty | 4/324 |
| 3,736,690 | 6/1973 | Witkowski | 43/44.9 |
| 3,921,226 | 11/1975 | MacDonald | 4/402 |
| 3,982,283 | 9/1976 | Goldring | 4/324 |
| 4,135,263 | 1/1979 | Anderson | 4/324 |
| 4,155,128 | 5/1979 | Dyer | 4/393 |

Primary Examiner—Henry J. Recla
Assistant Examiner—Linda J. Sholl
Attorney, Agent, or Firm—Frederick J. Olsson

[57] ABSTRACT

A water saver unit to be immersed in an filled with the water of a water-flush toilet system, the unit comprising a hollow body having a pair of clearance holes disposed diametrically opposite one another; a slot formed in the body and connected to and extending between said clearance holes, the slot and clearance holes providing communication between the outside and inside of the body to permit the body to be filled with water. The body being formed of flexible material so that pressure applied adjacent each said clearance hole and respectively directed toward the center of the body caused the body to distort, which distortion cause the slot to increase in width and so that when said pressure is relieved, the body will return to the non-distorted condition wherein the width of the slot is the same as before said distortion; and a weight inside of said body and being in the form of an annular member, having a central clearance aperture and a slot extending from the aperture to the periphery of the member.

7 Claims, 1 Drawing Sheet

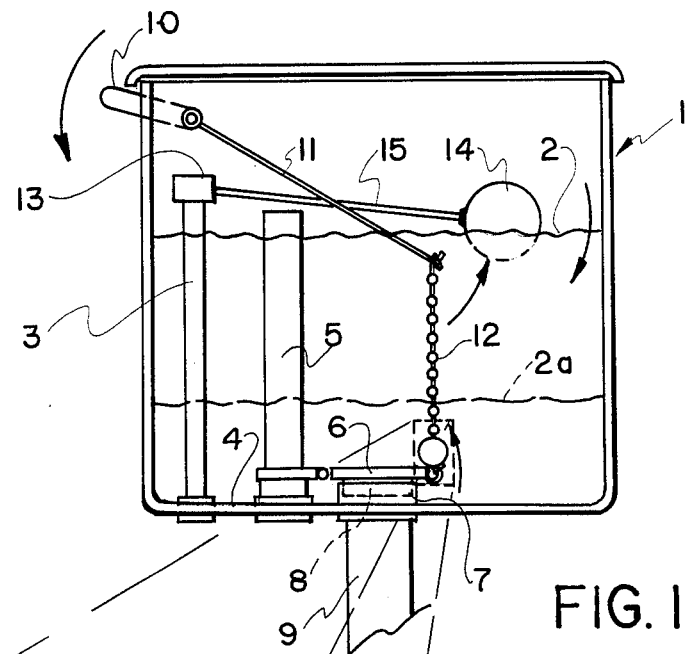
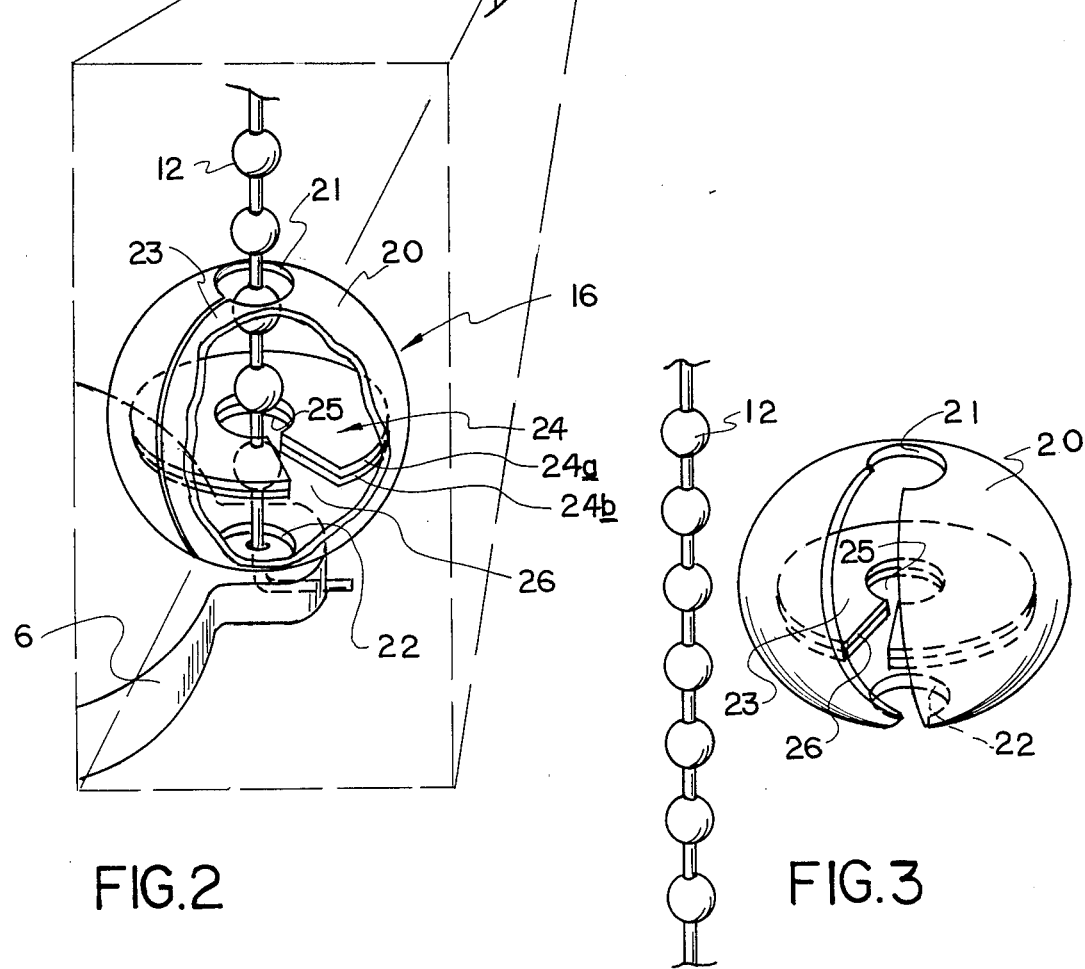
FIG. 1
FIG. 2
FIG. 3

QUICK CONNECT WATER SAVER FOR A FLUSH TOILET

This invention relates to flush toilets of the type wherein approximately five gallons of flush water is held in a tank and released into the toilet bowl through the opening of a discharge valve activated by a manually operated handle.

More particularly, the invention relates to weight means and a structure for holding the weight means which is connected to the discharge valve to automatically cause the discharge valve to close after a significantly smaller quantity of water has been discharged, the smaller quantity being preferably about three gallons.

The result achieved by the invention is that significant amounts of water are saved. For example, it is estimated that the average home may have two flush toilets each of which are flushed fifteen times a day. Each toilet equipped with my invention, the average household would save well over 11,000 gallons of water each year.

The invention herein constitutes a substantial improvement over the invention disclosed in my copending application Ser. No. 820,996 filed Jan. 22, 1986 now abandoned and entitled "Water Saver for a Flush Toilet".

The improvement comprises two aspects, one in the structure of the weight means and the other in the structure by which the weight means is supported and mounted on the flexible or rigid connector between the lever bar and discharge valve of the flush toilet tank.

The invention provides a unit: (a) which accomplishes the water saving objective; (b) which is very low in cost; and (c) which, very importantly, can be set into position without the use of any tools and without disconnecting or disturbing any component of the flush tank system.

Installation of the unit is of ultimate simplicity. The unit is squeezed between the finger, pushed onto the flexible or rigid connector, released, and then given a slight spin with an index finger. The unit is then ready for operation in the flush toilet.

The preferred form of the invention will be described below in connected with the following drawings wherein:

FIG. 1 is a side elevational view of a conventional flush toilet tank with the water level in ready condition for a flush operation and with the unit of the invention in position on the discharge valve;

FIG. 2 is an enlarged view taken in the enclosed area of FIG. 1; and

FIG. 3 is a perspective view illustrating how the unit of the invention is to be mounted.

In FIG. 1 a tank 1 holds approximately five gallons of water, the level of which is indicated at 2. A water intake pipe 3 is connected to the bottom 4 of the tank and extends vertically upwardly. A water overflow pipe 5 is also connected to the bottom and extends vertically upwardly. A flapper type valve 6 has a seat 7 and a plug 8. The seat 7 is connected to the bottom 4 and is joined to a water discharge pipe 9, which leads to the toilet bowl. The plug 8 is connected to the bottom of the pipe 5 and can move from the closed position of FIG. 1 to an open position, not shown. In the closed position of FIG. 1, the valve retains the water in the tank while in the open position, the valve allows the water to flow past the seat 7 and out through the discharge pipe 9 into the toilet bowl.

The plug is moved from the closed to the open position by manually rotating a handle 10 which rotates a lever bar 11 counter-clockwise. The lever bar 11 carries a chain 12 which is connected to the valve 7 which moves the plug 8 of the valve 6 away from the seat 7. Normally, after the handle has rotated the lever bar 11 to the uppermost position, the handle is released. The flexible chain 12 then allows the lever bar 11 to return to the position of FIG. 1.

On the top of the intake pipe 3 is a valve means 12 which is adapted to be opened and closed so as to permit water to flow into the tank or to stop such flow. The operation of the valve 13 is controlled by a hollow float 14 connected to the valve 13 by float bar 15. The float 14 rises and falls with the water level. As shown in FIG. 1, when the water is at the level 2, the float 14 has stopped the flow. As the water level moves down, the float also moves down to open the valve 13 and permit entry of water into the tank. Normally, the rate at which water enters the tank is substantially greater than the rate at which water is discharged through valve 6.

The plug 8 and all of the other types of plugs used in discharge valves for toilet tanks are designed so that when the plug of the valve opens, the rate of water flowing out through the valve seat maintains the plug away from the seat until such time as the rate of flow reduces (due to decreased head) to a point where the rate of flow is not sufficient to maintain the plug away from the seat and the same moves down on the seat to stop the flow. At that time, the water entering the tank from the intake pipe 3 begins to fill the tank and then continues until the float cuts off the water supply.

As will be apparent from the above description, the flexibility of the chain 12 functions as a slip section in permitting the lever bar 11 to return from the down position to the position of FIG. 1 without exerting any force on the plug 8 to cause the same to move down against the water pressure holding the same away from the seat 7.

With the above in mind, my invention contemplates the employment of a unit including weight means on the plug of a flush toilet discharge valve which produces a downward force on the plug of a magnitude which will overcome the upward force of the discharge flow holding the plug off the seat at a point where approximately three gallons have been discharged. Two gallons of the conventional five gallons in the tank is saved. In other words, at the appropriate time in the discharge cycle, the downward force of my weight means is greater than the upward force of the discharge flow and my weight means causes the plug to close. From experimenting, I have found that a weight means in the range of 3 to 7 ounces provides very satisfactory results.

While I will explain the use of the invention in a flush toilet wherein the connection between the plug valve 7 and the lever bar 11 is a flexible chain, it will be understood that the unit is equally useful in flush toilets wherein the connection between the lever and the discharge valve comprises a slip-type rod and link.

As seen in the drawings, the unit 16 of the invention comprises a hollow member 20 which in this case is a sphere. The member 20 is made of conventional plastic material which will flex under pressure and return to its original condition when pressure is relieved. The member 20 is approximately ½" diameter and has a wall thickness of approximately 1/16".

The member 20 has a pair of clearance apertures 21 and 22 which are diametrically opposed to one another. The member 20 is also formed with a slot 23 which extends between the clearance apertures 21 and 22

Inside of the member 20 is a weight means 24 which in this case is in the form of a disk. The weight means 24 has a central clearance aperture 25 and a radial slot 26 which extends from the aperture 25 to the peripheral of t weight means. The weight means 24 is mounted in the member by sliding the same through the slot 23. The manner in which slot 23 is opened for passage of the weight means 24 is explained below.

The weight means 24 is formed as by a stainless steel piece 24a and a plastic piece 24b latter being preferably polystyrene which is glued to the piece The piece 24a is approximately 1¾" in diameter and ⅛" thick. The piece 24b is the same size. The piece 24b provides some buoyancy, but is not necessary for the unit to function to accomplish the features (a), (b), and (c) previously mentioned. As will be apparent from an inspection of FIG. 2, the unit 16 is mounted in the chain 12 with the clearance holes 21, 22, and 25 being large enough so that the sphere 20 and weight means 24 are freely s on the chain.

The manner in which unit is mounted on the chain (or link) will be explained in with FIG. 3.

First, the unit is he so that the clearance holes 21 and 22 are substantially vertical. Then the unit is given a short, rapid horizontal twist unit radial slot 26 in the weight means is aligned with the slot Then the thumb is placed adjacent the clearance hole 21 and forefinger adjacent the clearance hole 22.

Pressure is now applied adjacent each clearance hole respectively directed toward the center of the sphere by squeezing the sphere between the thumb and forefinger until the slot 23 opens far enough so that the chain 12 can pass through the slot.

The unit is now moved toward the chain until the same occupies the clearance holes 21, 22, and 25. The pressure is relieved and the slot will close. The unit is then spun on the chain until the radial slot 26 is out of alignment with the slot 23. The unit is released and the same sinks down to engage the valve 6 as noted in FIG. 1. When the bottom of the sphere 20 engages the valve 6, the force of the weight means 24 is transferred to the valve 6 through the sphere 20.

The unit is now ready for operation.

It will be evident that the slot 23 is opened for passage of the weight means 24 in the manner described above. Further, it will be evident that the member 20 provides a simplified means for mounting and maintaining the weight means so that the force developed by same is applied to the valve 6.

Before closing, it is pointed out that the openings 21 and 22 and slot 23 permit the sphere 26 to fill with water and that in operation the sphere has some weight, the force of which is applied to the plug valve.

I claim:

1. A water saver unit to be immersed in and filled with the water of a water-flush toilet system, the unit comprising:
    a hollow body having a pair of clearance holes disposed diametrically opposite one another;
    a slot formed in the body and connected to and extending between said clearance holes, the slot and clearance holes providing communication between the outside and inside of the body to permit the body to be filled with water;
    the body being formed of flexible material so that pressure applied adjacent each said clearance hole and respectively directed toward the center of the body causes the body to distort, which distortion causes the slot to increase in width and so that when said pressure is relieved, the body will return to the non-distorted condition wherein the width of the slot is the same as before said distortion; and
    weight means inside of said body and being in the form of an annular member, having a central clearance aperture and a slot extending from the aperture to the periphery of the member.

2. The water saver of claim 1 wherein said body is a sphere.

3. The water saver of claim 1 wherein said annular member is in the form of a disc.

4. The water saver of claim 1 wherein said body is in the form of a sphere and said annular member is in the form of a disc.

5. A water saver unit to be immersed in and filled with the water of a water-flush toilet system, the unit comprising:
    a hollow body having a pair of clearance holes disposed diametrically opposite one another;
    a slot formed in the body and connected to and extending between said clearance holes, the slot and clearance holes providing communication between the outside and inside of the body to permit the body to be filled with water;
    the body being formed of flexible material so that pressure applied adjacent each said clearance hole and respectively directed toward the center of the body causes the body to distort, which distortion causes the slot to increase in width and so that when said pressure is relieved, the body will return to its non-distorted condition wherein the width of the slot is the same as before said distortion; and
    weight means inside of said body.

6. The water saver of claim 4 wherein said body is a sphere.

7. A water saver unit to be immersed in and filled with the water of a water-flush toilet system, the unit comprising:
    a hollow body having a pair of clearance holes disposed diametrically opposite one another;
    a slot formed in the body and connected to and extending between said clearance holes, the slot and clearance holes providing communication between the outside and the inside of the body to permit the body to be filled with water; and
    the body being formed of flexible material so that pressure applied adjacent each said clearance hole and respectively directed toward the center of the body causes the body to distort, which distortion causes the slot to increase in width and so that when said pressure is relieved, the body will return to its non-distorted condition wherein the width of the slot is the same as before said distortion.

* * * * *